N. B. DOUGLAS.
Hay Loader.
No. 79,327. Patented June 30, 1868.
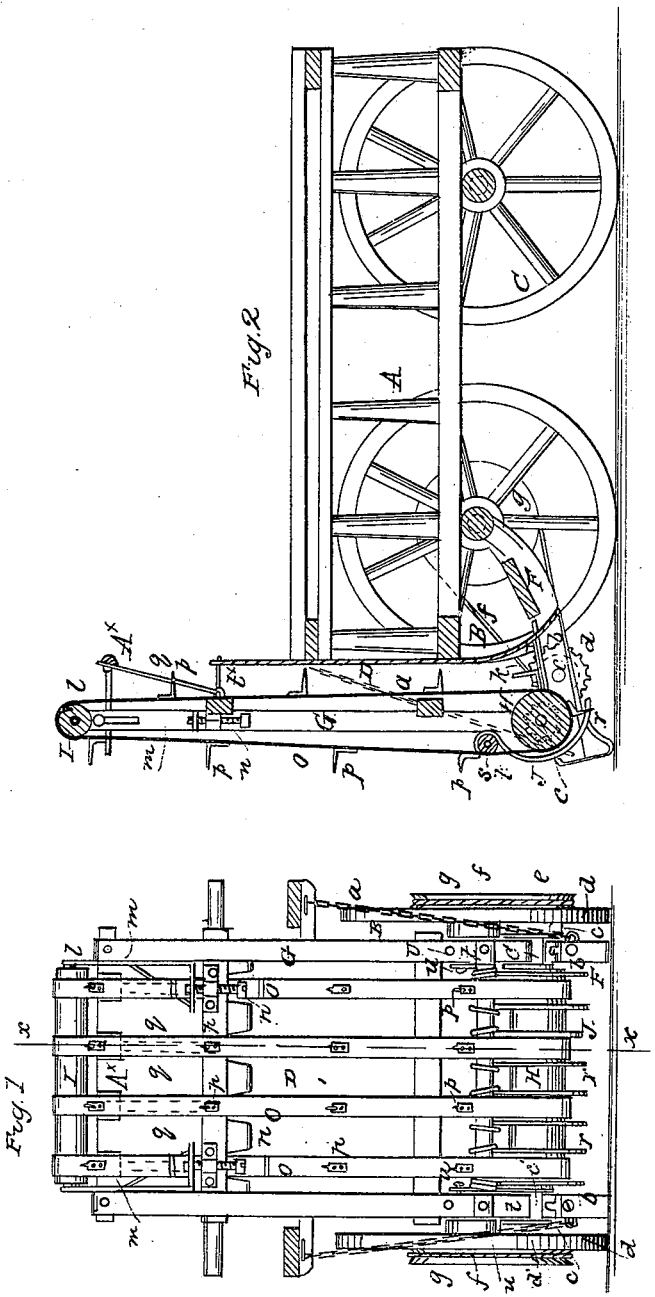
WITNESSES
INVENTOR
N. B. Douglas

United States Patent Office.

N. B. DOUGLAS, OF CORNWALL, VERMONT.

*Letters Patent No. 79,327, dated June 30, 1868.*

IMPROVEMENT IN HAY-LOADERS.

*The Schedule referred to in these Letters Patent and making part of the same.*

TO ALL WHOM IT MAY CONCERN:

Be it known that I, N. B. DOUGLAS, of Cornwall, in the county of Addison, and State of Vermont, have invented a new and improved Hay-Loading Device; and I do hereby declare that the following is a full, clear, and exact description thereof, which will enable others skilled in the art to make and use the same, reference being had to the accompanying drawings, forming a part of this specification.

This invention relates to a new and improved device for raking up and loading hay upon wagons, and has for its object the obviating of hand-labor in pitching hay on wagons.

The invention consists in a peculiar construction and arrangement of parts, as hereinafter fully shown and described, which form an attachment capable of being applied to the rear parts of an ordinary farm-wagon, and so as to operate in the most efficient manner.

In the accompanying sheet of drawings—

Figure 1 is a rear elevation of my invention applied to a wagon.

Figure 2, a side sectional view of the same, taken on the line $x$ $x$, fig. 1.

Similar letters of reference indicate corresponding parts.

A represents the body of a wagon, B the rear, and C the front wheels thereof. These parts, which may be of usual construction, do not require a special description.

To the rear end of the body A of the wagon there is attached a vertical plate, D, by screws or otherwise, and on the rear axle E of the wagon there is hung loosely a frame, F, the outer end of which is retained at a proper height by chains $c$ attached to the rear end of the body A.

To each side bar $b$ of the frame F there is secured a fixed arm, $c$, on which a toothed wheel, $d$, is fitted loosely, each wheel $d$ having a pulley, $e$, at its outer side, around which pulleys bands $f$ pass, said bands also passing around pulleys $g$ on the outer sides of the wheels B.

G is a rectangular frame, having a roller, H, in its lower end. The shaft $e'$ of this roller extends beyond each side of the frame G, and has wheels $d'$ upon it, which gear into the wheels $d$, the lower end of the frame G being secured to the bars $b$ of frame F by suitable fastenings $k$.

At the upper part of the frame G there is a roller, I, the shaft $l$ of which has its bearings in slide-bars $m$, which are adjusted by screws $n$, shown clearly in both figures. The roller I is thereby rendered adjustable, and for the purpose of keeping a series of belts $o$, which is fitted on the rollers H I, at a requisite degree of tension at all times.

The belts $o$ are provided with a series of teeth $p$ of a requisite length.

To the front side of the frame G, at its upper part, there is attached a series of inclined plates $g$, spaces being allowed between said plates, which spaces are in line with the teeth $p$ of the belts $o$. These plates serve as a discharger, $A^\times$, to throw or strip the hay from the teeth $p$ into the wagon, as will be understood by referring to fig. 2.

J is a rake, the teeth $r$ of which are curved similar to those of a horse-rake, and they are attached to a head or shaft, $s$, provided at each end with a journal, $t$, which are fitted in bearings $u$ at each side of the frame G. The shaft $s$ has a spring, $v$, on each end of it, and these springs bear against stops $w$ at the sides of frame G, and keep the rake-teeth $r$ in a proper working position.

As the wagon is drawn along, the teeth $p$, of the belts $o$, which are operated from the wheels B B of the wagon, take up the hay from the windrow and carry it up between the front side of frame G and the rear side of plate D, the hay being discharged into the wagon by the discharger $A^\times$. The rake J serves to gather or collect any hay which may escape the teeth $p$, and admit of the latter eventually taking it up and discharging it into the wagon.

The frame G may be readily attached to and detached from the wagon, the upper part of the frame G having hooks $t^\times$ attached, which are braced by a side rod to avoid a lateral swaying of the frame G. The rake J, by freeing the springs $v$ from the stops $w$, may be turned backward and upward out of the way, whenever it is necessary to lower the frame G.

Having thus described my invention, I claim as new and desire to secure by Letters Patent—

1. The removable frame G, attached to a frame, F, hung on the rear axle of the wagon, in combination with the toothed belts $o$, and the discharger $A^\times$, all arranged to operate in the manner substantially as and for the purpose set forth.

2. The rake-head $s$, hung to the frame G in such a manner that by freeing the springs $u$ upon the head, from the stops $w$ upon the frame, the rake J can be turned up and rendered inoperative, as herein shown and described.

The above specification of my invention signed by me, this ninth day of March, 1868.

N. B. DOUGLAS.

Witnesses:
    J. A. FRASER,
    ALEX. F. ROBERTS.